United States Patent [19]

Boakes

[11] Patent Number: 5,946,390
[45] Date of Patent: Aug. 31, 1999

[54] INTELLIGENT TELEPHONE SYSTEM AND METHOD FOR DETERMINING DIALING PREFIXES

[75] Inventor: Edward W. Boakes, Middletown, N.J.

[73] Assignee: Lucent Technologies Inc., Murray Hill, N.J.

[21] Appl. No.: 08/808,281

[22] Filed: Feb. 28, 1997

[51] Int. Cl.⁶ .................................................. H04M 1/00
[52] U.S. Cl. .......................................... 379/355; 379/206
[58] Field of Search ................................... 379/354, 355, 379/201, 207, 216, 210, 211, 212, 206; 455/564

[56] References Cited

U.S. PATENT DOCUMENTS

| | | | |
|---|---|---|---|
| 5,157,719 | 10/1992 | Waldman | 379/356 |
| 5,455,858 | 10/1995 | Lin | 379/355 |
| 5,475,743 | 12/1995 | Nixon et al. | 379/113 |
| 5,528,680 | 6/1996 | Karpicke | 379/355 |

*Primary Examiner*—N. Le
*Assistant Examiner*—Shih-Wen Hsieh

[57] ABSTRACT

A telephone system and method where telephones automatically learn the required prefix codes used in a private system to reach a public telephone exchange. The telephone has a memory that stores the numbers of callers who have called that telephone. A microprocessor then compares each number dialed on that telephone to the stored numbers saved by the telephone. The comparison is done from the last digit in each number to the first digit in each number. If at least the last seven digits of a dialed number match at least the last seven digits of a saved number, then a match is considered to occur. By analyzing the numbers in a dialed number that are not the same as the numbers in a matched saved number, the microprocessor can determine a possible prefix code that was contained within the dialed number. By performing a statistical analysis of possible prefix codes, the microprocessor can determine the proper prefix code for the telephone. Using similar analysis, the microprocessor can also automatically determine the area code in which the telephone is present the upper and lower limits of the private exchange to which the telephone belongs, and the digits between the local areacode and an extension on the private PBX.

20 Claims, 3 Drawing Sheets

INTELLIGENT TELEPHONE SYSTEM AND METHOD FOR DETERMINING DIALING PREFIXES

BACKGROUND OF THE INVENTION

1. Field of the Invention

The present invention relates to telephone systems and related methods that enable a telephone in a private system to automatically access an external telephone line.

2. Description of the Prior Art

Many telephones systems are connected in a Centrex arrangement or on a private PBX. Such systems are often used by companies to interconnect office telephones or to interconnect telephones in different buildings. This enables one employee of the company to call another employee of that company without ever involving the local public telephone network. In such telephone systems, if a person wants to call a person outside of the Centrex arrangement or private PBX, then the telephone from which the call is being placed must first be connected to an external telephone line outside of that system. In order to connect a telephone to an external line, often a number sequence must first be dialed. For example, in many business telephone systems, though a user hears a dial tone when the telephone receiver is placed to the ear, that dial tone can only be used to dial other telephones contained within the same system. If a number outside the telephone system is dialed, the call will not be completed. It is common in many such telephone systems for a prefix code such as a number or a number sequence to first be dialed in order to reach an outside telephone line. In many systems, the number "9" must be dialed as the prefix code in order for a particular telephone to be connected to a dial tone for an outside line.

Many modern telephones display and store telephone numbers associated with incoming calls. In certain telephones, the number sequence of a prior incoming call can be retrieved from memory and can be automatically redialed. People can also purchase Caller ID® devices that store the number of incoming calls and redial those numbers on command. Such telephones and devices dial the exact number that was received. As a result, such telephones and devices do not work well in systems where prefix codes must be dialed in order to connect to an outside line. For example, suppose a telephone in a system receives a call from New Jersey from the number (908) 321-4567. The telephone stores the number sequence "9083214567" in its memory. If that number is retrieved to be automatically redialed, the exact number sequence 9083214567 will be redialed. If the telephone is in a system where "9" must first be dialed to reach an outside line, the following results. When the "9" is redialed, the telephone connects to an outside line. When the next numbers "0832" are redialed, the local telephone network receives the "0" and assumes that the person is placing either an operated assisted call or a calling card call to area code "832". The next three numbers "145" are dialed as the exchange and the last two numbers are dialed as an incomplete final call address. So instead of dialing the number 321-4567 in area code (908) as was intended, the telephone dials the incomplete number 145-67 in area code (832).

In the prior art, telephones used in Centrex arrangements or on private PBXs have solved this problem by various program functions that enable a user to program the needed dialing prefixes into a telephone. However, many telephones do not have alpha-numeric displays that can prompt a user. As a result, a user must read the telephone manual that came with the telephone and that user must perform the proper programming sequence. Since most people move into offices where the telephone is already in place, the manuals for the telephone are seldom available and the proper programming sequence rarely executed. Rather, the user of the telephone simply ignores the call redial function present in the telephone.

A need therefore exists for a telephone and associated method that can be used in a system having a private PBX enabling the call redial functions of that telephone to operated properly.

SUMMARY OF THE INVENTION

The present invention is a telephone system and method whereby telephones can essentially "learn" the required prefix codes used in a private system to reach a public telephone exchange. The telephone has a memory that stores the numbers of callers who have called that telephone. A microprocessor then compares each number dialed on that telephone to the stored numbers saved by the telephone. The comparison is done from the last digit in each number to the first digit in each number. If at least the last seven digits of a dialed number match at least the last seven digits of a saved number, then a match is considered to occur. By analyzing the numbers in a dialed number and determining those numbers that are not the same as the numbers in a matched saved number, the microprocessor can determine a possible prefix code that was contained within the dialed number. By performing a statistical analysis of possible prefix codes, the microprocessor can determine the proper long distance and local prefix codes for the telephone. Using similar analysis, the microprocessor can also automatically determine the area code in which the telephone is present, the number of digits dialed for an intra-PEX call, the digits between the areacode digits and the digits dialed for an intra-PBX call (the "exchange") and from one to a multiplicity of upper and lower limits for ranges of intra-PBX phone numbers.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention can be used in most any telephone system where a predetermined dialing prefix must be dialed in order to reach an outside telephone line. For the purposes of example only, the following description uses a telephone system where a user must first dial the number nine "9" in order to reach an outside line. However, it should be understood that the number nine "9" is arbitrary and any other single or multiple number dialing prefix can also be used.

Figure 1:
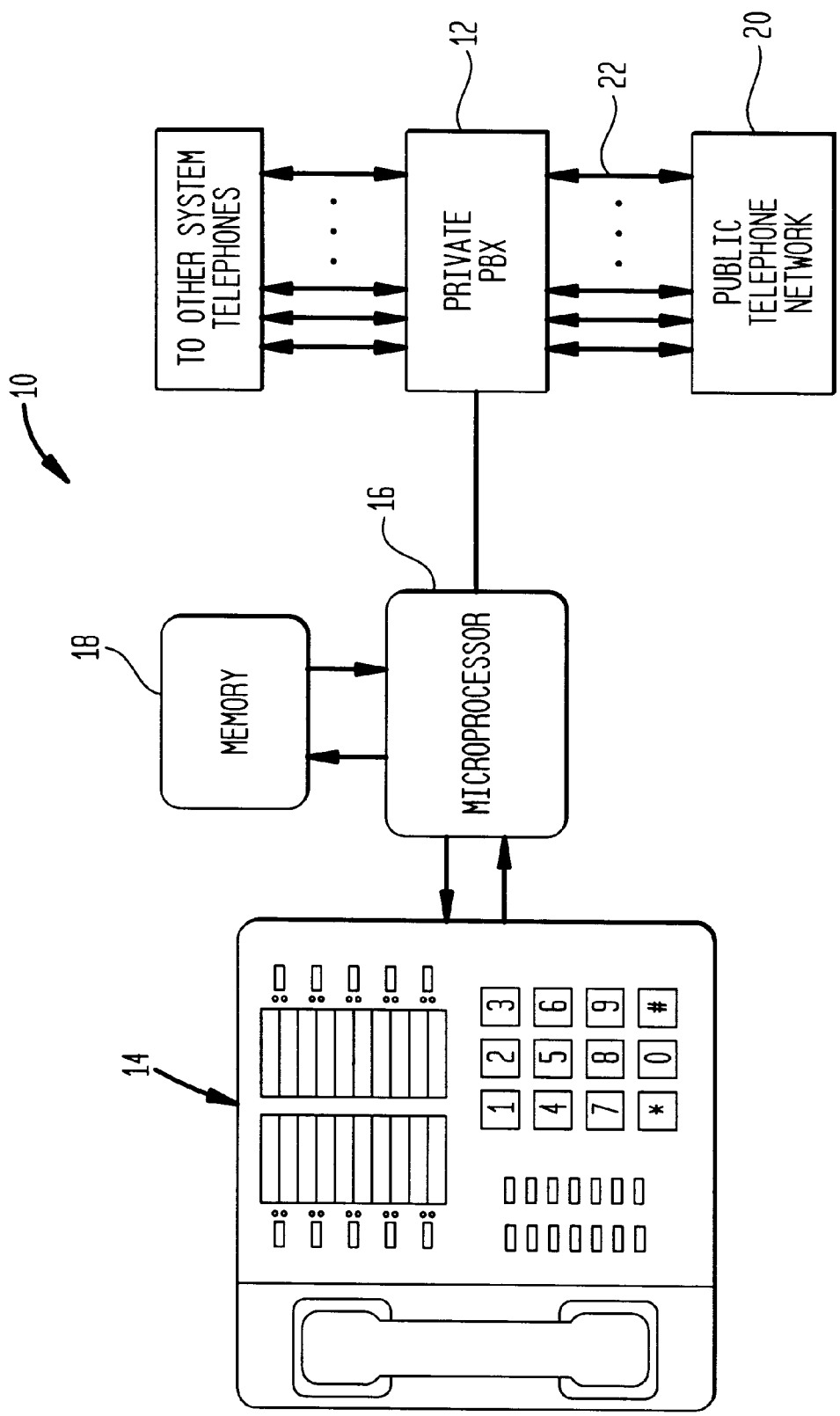
FIG. 1 is a block diagram schematic showing an intended use of an exemplary embodiment of the present invention telephone system.

Referring to FIG. 1, an exemplary telephone system 10 is shown in accordance with the present invention. The telephone system 10 uses a private PBX 12 or Centrex telephone arrangement, wherein a plurality of individual telephones 14 are joined to the private PBX 12. Each telephone 14 contains a digital processor, for example a microprocessor 16, and a memory 18. The microprocessor 16 and memory 18 enable each telephone 14 to store the telephone number of a caller that places a call to that telephone 14. The microprocessor 16 and memory 18 can be part of some caller ID functions contained within the telephone 14 or can be a caller ID unit bought separately and attached to the telephone 14.

The private PBX 12 in the telephone system 10 is coupled to a local public telephone network 20. In order for one of the telephones 14 in the system 10 to reach an external line 22 that leads to the public network 20, the person using the telephone 14 must first dial a prefix code. The prefix code instructs the private PBX 12 to connect that telephone 14 to an external line 22. As has been previously stated, it is to be assumed that the number nine "9" must be dialed in the shown telephone system 10 in order to connect any telephone 14 with a external line 22 leading to the public PBX 20.

Figure 2:
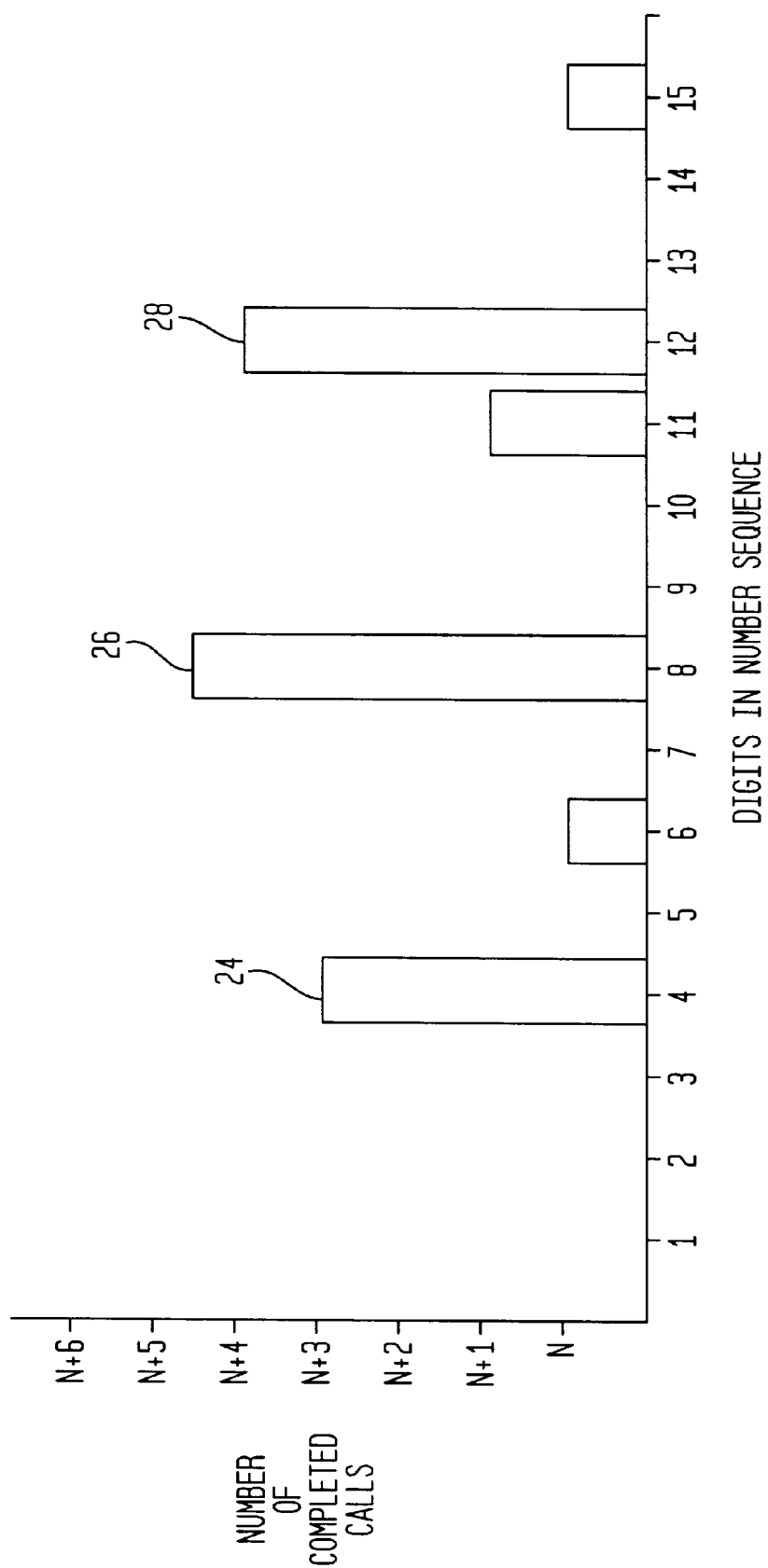
FIG. 2 shows a statistical histogram that plots the number of completed calls made by a telephone against the number of digits dialed to achieve the completed calls.

Each time a person completes a telephone call from a telephone 14, the microprocessor 16 of that telephone 14 detects the number of key events dialed to complete that call and performs a statistical analysis of the data. Referring to FIG. 2, it can be seen that after a statistically significant number of telephone calls have been completed, a recognizable statistical pattern develops. By plotting the data, as shown by FIG. 2, it can be seen that three primary spikes 24, 26, 28 occur in the statistical pattern. The first spike 24 typically occurs either at the three digit, four digit or five digit location. In the shown embodiment, the first spike 24 is shown at the four digit location. This location shows that a person using the telephone 14(FIG. 1) makes a lot of four digit telephone calls. From this, it can be assumed that the telephone system 10 (FIG. 1) and the private PBX 12 (FIG. 1) is accessed by dialing a four digit number. The spike 24 at the four digit location therefore shows that the user of the telephone often calls others connected to the same private PBX 12 without involving an external line. It will be understood that if the private PBX 12 were accessed by two, three, five or six digits, the first statistical spike would occur at the second, third, fifth or sixth digit location, respectively.

The second statistical spike 26 typically occurs at the eighth digit location. This statistical spike 26 shows that the user of the telephone 14 (FIG. 1) often dials a seven digit telephone number preceded by a one digit prefix code (i.e. "9"). If the required prefix code were two digits or three digits, the statistical spike would be at the ninth digit or tenth digit location, respectively.

The third statistical spike 28 typically occurs at the twelfth digit location. This statistical spike 28 shows that the user of the telephone 14 (FIG. 1) often dials a seven digit telephone number preceded by a three digit area code, the number one "1" and a one digit prefix code (i.e. "9"). The dialing of the number one "1" plus the area code is a standard dialing protocol for placing a domestic long distance call. If the required prefix code were two digits or three digits, the statistical spike would be at the thirteenth digit location or the fourteenth digit location, respectively. The statistical occurrences beyond the third statistical spike 28 represent overseas calls and other rarer call instances. Other statistical occurrences may include calls to an intra-PBX operator, an external operator, an external long distance operator, calls to numbers such as 411, 611, etc.

Figure 3:
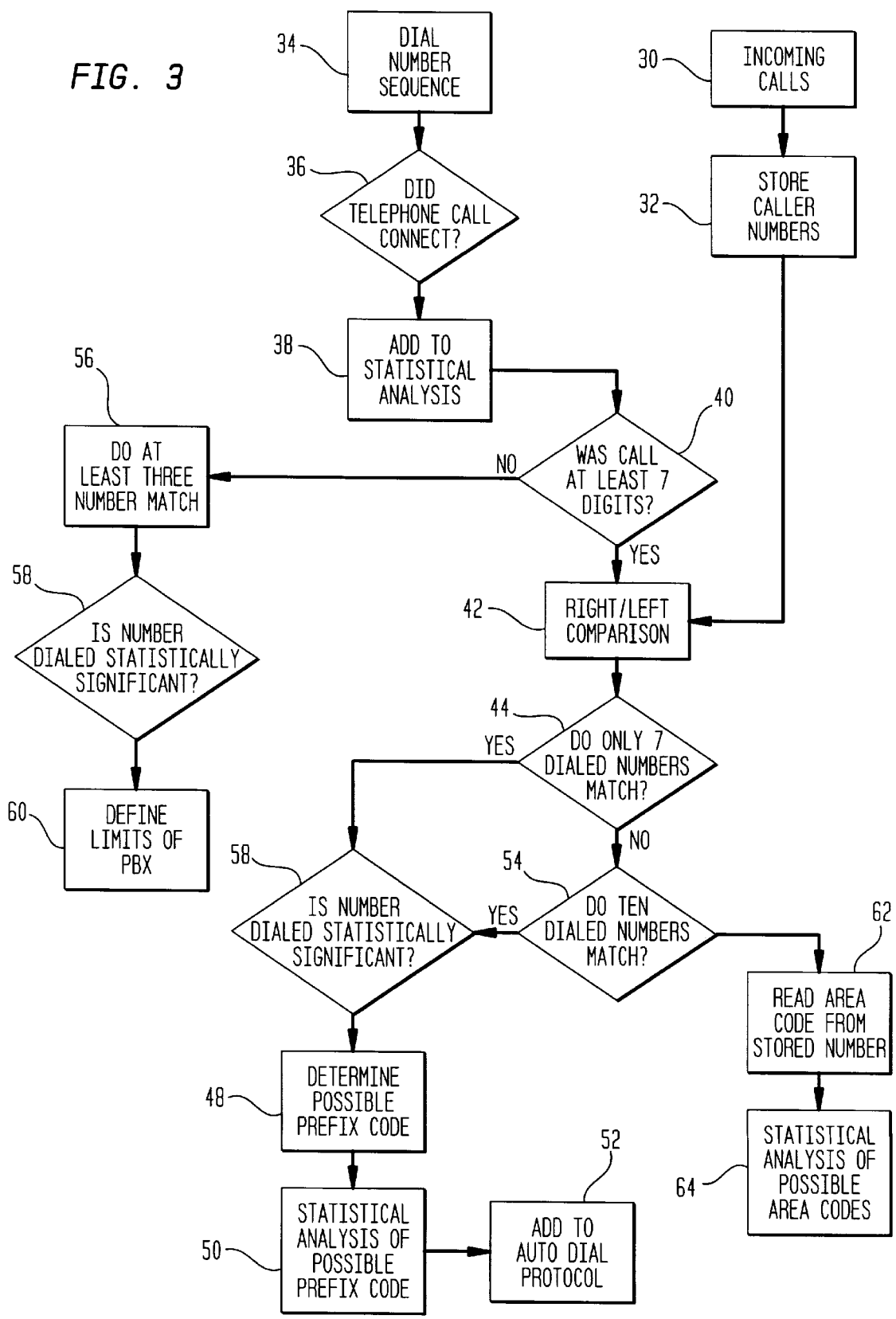
FIG. 3 is block diagram schematic showing a logic flow for one method of operation of the present invention.

Referring to FIG. 3, a preferred method of operation in accordance with the present invention is described. The telephone 14 (FIG. 1) is of the type that has a memory 18 (FIG. 1) that saves the phone number of the callers who have dialed that telephone 14 (FIG. 1). As the telephone 14 (FIG. 1) receives calls, the caller's numbers are stored in the memory 18 (FIG. 1) of the telephone. This is shown by block 30, and block 32, respectively. Over time, a significant database of incoming calls is stored. If memory space is limited, the database can be sorted to contain several of the most recently received calls or several of the most commonly received calls. The numbers saved will most all be ten digits long. This is because in a caller ID system, the local public network typically sends both the caller's area code and number to a user's telephone. For most domestic calls the received number will therefore be ten digits.

As is indicated by block 34, block 36 and block 38, respectively, when a call is dialed, the microprocessor 16 (FIG. 1) in the telephone 14 (FIG. 1) determines if the dialed call is completed. If the dialed call is completed, the number of key events in the dialed call is added to the statistical analysis that produced the histogram of FIG. 2. As indicated by block 40, if the dialed number was not at least seven digits, then the microprocessor 16 (FIG. 1) can assume that the dialed number was not intended to leave the private PBX 12 (FIG. 1). The dialed number is compared with the database of stored caller numbers. This is indicated by block 42. The comparison is a right to left numerical comparison, wherein the last digit of the dialed number is first compared to the last digit of each saved caller number. The comparison then moves to the second to last and third to last digits, etc., until the comparison is complete.

If at least the last seven digits of the dialed number match a caller's number stored in memory 18 (FIG. 1), then a match is assumed. As indicated by block 44, if only the last seven digits of a dialed number match a stored caller number, then the numbers of the dialed number that do not match have the possibility of being the prefix code for the system containing that telephone 14 (FIG. 1). To see if the non-matching numbers are the prefix code, the total number of digits in the dialed number are checked. As indicated by block 46, the total number of digits dialed is checked to see if that number corresponds to the second statistical peak 26 as indicated in FIG. 2. If the number of digits dialed corresponds to the second peak 26 (FIG. 2), then the system can assume that the number dialed is a local call.

The numbers in the dialed number that do not match the stored caller number are identified as a potential prefix code, as is indicated by block 48. The potential prefix code is then stored in a statistical database, as is indicated by block 50. In the statistical data base, the occurrences of different saved prefix codes are saved. If one code is statistically dominant, that code is considered to be the local access prefix code for the telephone 14 (FIG. 1). That prefix code therefore is automatically added to the beginning of any local telephone call automatically dialed by that telephone, as indicated by block 52.

If at least the last ten digits of a dialed number match a caller's number stored in memory (FIG. 1), then a match is also assumed. As indicated by block 54, if the last ten digits of a dialed number match a stored caller number, then the numbers of the dialed number that do not match have the possibility of being the long distance prefix code for the system containing that telephone 14 (FIG. 1). To see if the non-matching numbers are the prefix code, the total number of digits in the dialed number are checked. As indicated by block 46, the total number of digits dialed is checked to see if that number corresponds to one of the statistical peaks as indicated in FIG. 2. If the number of digits dialed corresponds to the third statistical peak 28 (FIG. 2), then the system can assume that the number dialed is a long distance call.

The numbers in the dialed number that do not match the stored caller number are identified as a potential prefix code, as is indicated by block 48. The potential prefix code is then stored in a statistical database, as is indicated by block 50. In the statistical data base, the occurrences of different saved prefix codes are saved. If one code is statistically dominant, that code is considered to be the long distance access prefix code for the telephone 14 (FIG. 1). That prefix code therefore is automatically added to the beginning of any long distance telephone call that is automatically dialed by that telephone.

Returning to block 40, it can be seen that if a dialed number is less than seven digits long, a separate comparison is performed. The comparison first determines if at least three numbers match between the dialed number and a stored number. This is indicated in block 56. If a match is determined the number of digits dialed is checked to see if that number is statistically significant. As indicated by block 58, the total number of digits dialed is checked to see if that number corresponds to one of the statistical peaks as indicated in FIG. 2. If the number of digits dialed corresponds to the first statistical peak 24 (FIG. 2), then the system can assume that the number dialed is a intra-system call. All intra-system calls are assumed to be included within the upper and lower exchange limits of the private PBX 12 (FIG. 1). As is indicated by block 60, the limits of the private PBX 12 (FIG. 1) can eventually become known by adjusting those limits to always include an intra-system call.

Returning to block 44, it can be seen that the present invention is also capable of automatically determining the area code in which the telephone 14 (FIG. 1) operates. If only seven dialed digits match a stored number, the dialed call is assumed to be a local call. As such, the dialer would not dial an area code. However, the matching stored number also includes its area code. As is indicated by block 62, the area code of the stored number can then be considered to be a possible area code for the telephone 14 (FIG. 1). The saved possible area codes can be statistically analyzed, as is indicated by block.64. If one area code is statistically dominant, that area code is assumed to be the area code for the telephone 14 (FIG. 1).

The present invention system and method enables a telephone to automatically determine any required prefix code, the telephone's area code and the limits of the private PBX in which that telephone operates. By knowing this information, the telephone can add the appropriate prefix sequences to any retrieved number. Accordingly, the telephone can automatically dial numbers as though it were not part of a private exchange system. The various autodialing features of the telephone, in particular those related to placing calls to phone numbers delivered as incoming Caller ID®s, therefore become operational without any programming having to be performed by a user.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. In a telephone system of the type where a prefix code must be dialed to reach an external telephone line, a method of determining and automatically dialing the prefix code into a telephone said method comprising the steps of:

storing telephone numbers of callers who have called the telephone;

determining if the number manually dialed is statistically eligible for comparison with the stored numbers by statistically analyzing often manually dialed numbers on the telephone to determine how many digits are contained in said often manually dialed numbers and determining whether the number manually dialed has the same number of digits as some of the most often dialed numbers;

comparing a number manually dialed on said telephone to the stored telephone numbers of callers to find matches between the number manually dialed and the stored telephone numbers that at least partially contain the same number sequences;

determining a prefix code for the number manually dialed that matches a stored telephone number; and causing the telephone to automatically dial the prefix code when a stored telephone number is recognized and automatically dialed on the telephone.

2. The method according to claim 1, further including the step of determining whether the number manually dialed is at least seven digits long and proceeding with said step of comparing the number manually dialed to the stored telephone numbers only if the number manually dialed is at least seven digits long.

3. The method according to claim 1, wherein said step of comparing includes performing a last digit to first digit comparison of the number manually dialed to the stored telephone number.

4. The method according to claim 1, wherein said step of determining a prefix code includes assigning the portion of the number manually dialed that is not the same as the matched stored telephone number as the prefix code.

5. The method according to claim 1, wherein the telephone system has a private PBX of a predetermined range of exchange numbers and said method further includes the steps of determining said predetermined range of exchange numbers.

6. The method according to claim 5, wherein said step of determining the predetermined range of exchange numbers in the private PBX includes the substeps of:

statistically analyzing manually dialed numbers to determine if the number manually dialed accesses the private PBX;

adjusting the determined range of the private PBX to include the number manually dialed.

7. The method according to claim 6, wherein said substep of statistically analyzing manually dialed numbers includes determining if the number manually dialed is less than seven digits and determining whether the number manually dialed has the same number of digits as some of the most often manually dialed numbers that are dialed from the telephone.

8. The method according to claim 7, further including the step of having the telephone automatically determine the area code in which that telephone is located.

9. The method according to claim 8, wherein said step of having the telephone automatically determine the area code includes the substeps of:

determining if a manually dialed number is a local call;

matching said manually dialed number to a stored telephone number;

reading the area code of the stored telephone number, wherein that area code is assumed to be the area code in which the telephone is located.

10. A telephone that automatically determines a prefix code associated with a private telephone system that is needed to access a telephone line outside of the private telephone system, said telephone comprising:

a memory for storing telephone numbers from callers that have been received by the telephone:

a microprocessor that determines if a manually dialed number is statistically eligible for comparison with the telephone numbers stored in said memory by statistically analyzing often manually dialed numbers on the telephone to determine how many digits are contained in said often manually dialed numbers and determining whether the manually dialed number has the same number of digits as some of the most often dialed numbers, wherein said microprocessor compares the manually dialed number on the telephone to the stored telephone numbers in said memory, wherein the microprocessor determines the prefix code on the manually dialed number that partially matches a stored telephone number and automatically dials the prefix code each time a telephone number is recognized.

11. The telephone according to claim 10, wherein said microprocessor compares the manually dialed number to the stored telephone numbers from the last digit of each number to the first digit of each number.

12. The telephone according to claim 11, wherein the microprocessor determines a match when at least seven sequential digits of the manually dialed number match at least seven sequential digits of one of the stored telephone numbers.

13. The telephone according to claim 10, wherein said microprocessor automatically determines the area code in which the telephone is located by comparing manually dialed numbers to stored telephone numbers from callers.

14. The telephone according to claim 10, wherein the private PBX has an upper and lower limit and said microprocessor automatically determines said upper and lower limit by analyzing the manually dialed numbers entered into the telephone.

15. A method by which a telephone can automatically determine a required access code needed to place a telephone call, comprising the steps of:

storing telephone numbers from callers that have called the telephone;

determining if a number dialed from the telephone is statistically eligible for comparison with the stored numbers by statistically analyzing often dialed numbers on the telephone to determine how many digits are contained in said often dialed numbers and determining whether the number manually dialed has the same number of digits as some of the most often dialed numbers;

comparing a statistically eligible number dialed from the telephone to the stored telephone numbers from callers to determine if at least seven digits in each number match; and determining the access code from the statistically eligible number dialed that is determined to match a stored telephone number during the step of comparing.

16. The method according to claim 15, further including the step of entering the access code into an auto dial protocol wherein the telephone automatically adds the access code to the telephone number dialed.

17. A method for a telephone to automatically determine in which area code that telephone is installed, comprising the steps of:

storing telephone numbers of callers who have dialed to the telephone;

comparing numbers sequences dialed from the telephone with stored telephone numbers in a last digit to first digit comparison, wherein a number sequence having eight digits numbers, nine digits numbers and ten digits numbers that match a stored telephone numbers is considered a matched dialed number sequence;

storing a sequence of the eighth to last, ninth to last and tenth to last dialed digits in each matched dialed number sequence in a memory; and determining the area code of the telephone by statistically analyzing all sequences stored in said memory to determine which sequence is the most likely to be the area code for the telephone.

18. The method according to claim 17, further including the step of determining if a number sequence dialed from the telephone results in a completed call prior to said step of comparing.

19. In a private telephone system containing a predetermined range of exchange numbers, a method of determining the number of digits needed to be dialed to complete an intra-system call, said method comprising the steps of:

counting the number of digits dialed from at least one telephone in the private telephone system that results in a completed call;

saving said number digits in a memory up of said number of digits is less than seven;

statistically analyzing said number of digits saved in said memory to develop a statistical likelihood of an actual number of digits needed to be dialed to complete an intra-system call.

20. The method according to claim 19, further including the steps of:

comparing dialed numbers that contain said actual number of digits to the predetermined range of exchange numbers in the private telephone system;

expanding said predetermined range of exchange numbers to include any dialed number that contains said actual number of digits and results in a completed call.

* * * * *